(12) United States Patent
Villaret

(10) Patent No.: US 9,252,650 B2
(45) Date of Patent: Feb. 2, 2016

(54) TRANSVERSE FLUX ELECTRICAL MOTOR

(75) Inventor: Yves Villaret, Hadera (IL)

(73) Assignee: Yaskawa Europe Technology Ltd., Rosh Ha'Ayin (IL)

( * ) Notice: Subject to any disclaimer, the term of this patent is extended or adjusted under 35 U.S.C. 154(b) by 286 days.

(21) Appl. No.: 13/392,525

(22) PCT Filed: Aug. 31, 2010

(86) PCT No.: PCT/IL2010/000717
§ 371 (c)(1),
(2), (4) Date: Feb. 27, 2012

(87) PCT Pub. No.: WO2011/033499
PCT Pub. Date: Mar. 24, 2011

(65) Prior Publication Data
US 2012/0205992 A1 Aug. 16, 2012

Related U.S. Application Data

(60) Provisional application No. 61/238,224, filed on Aug. 31, 2009.

(51) Int. Cl.
H02K 1/17 (2006.01)
H02K 41/03 (2006.01)
H02K 21/44 (2006.01)

(52) U.S. Cl.
CPC ............... *H02K 41/03* (2013.01); *H02K 21/44* (2013.01); *H02K 2201/12* (2013.01)

(58) Field of Classification Search
CPC .................................. H02K 1/17; H02K 21/38
USPC .......... 310/12.01–12.05, 12.14, 12.15, 12.21, 310/12.22, 12.18, 12.24–12.26, 156.02, 13
See application file for complete search history.

(56) References Cited

U.S. PATENT DOCUMENTS

| 4,200,344 | A | | 4/1980 | Binns et al. |
| 5,218,250 | A | * | 6/1993 | Nakagawa ................. 310/12.21 |
| 5,854,521 | A | * | 12/1998 | Nolle ..................... 310/216.004 |
| 6,043,579 | A | * | 3/2000 | Hill ............................... 310/164 |
| 6,236,124 | B1 | * | 5/2001 | Sekiyama et al. ......... 310/12.24 |
| 6,849,969 | B2 | * | 2/2005 | Kang et al. ................. 310/12.25 |

(Continued)

OTHER PUBLICATIONS

Blissenbach R et al. "A Passive Rotor Transverse Flux Motor". Workshop on Variable Reluctance Electrical Machines, Technical University of Cluj-Napoca, Romania, Sep. 17, 2002.*

(Continued)

*Primary Examiner* — Naishadh Desai
(74) *Attorney, Agent, or Firm* — Edward Langer

(57) ABSTRACT

A transverse flux electrical motor to produce motion from an input electric current, the electrical motor comprising: a static element having a plurality of magnets arranged in at least two rows and defining a path of movement; a magnetizable movable element having at least two openings, each opening being sized and shaped to receive a magnet from one of the rows of magnets, the movable element being movable along the path of movement such that the magnets of each row pass through one of the openings; and a plurality of windings positioned adjacent to the movable element, to receive the electric current and produce a magnetic flux circuit in the movable element and a force on the movable element in the direction of the path of movement; wherein the magnetic flux circuit in the movable element is transverse to the direction of force on the movable element.

22 Claims, 11 Drawing Sheets

(56) References Cited

U.S. PATENT DOCUMENTS

| | | | |
|---|---|---|---|
| 2007/0114854 A1 | 5/2007 | Miyamoto | |
| 2007/0176505 A1 | 8/2007 | Trzynadlowski et al. | |
| 2007/0182256 A1* | 8/2007 | Potter | 310/12 |
| 2007/0278886 A1 | 12/2007 | Fujiwara | |
| 2008/0024014 A1 | 1/2008 | Kang et al. | |
| 2008/0265689 A1* | 10/2008 | Armeit et al. | 310/12 |
| 2009/0108782 A1 | 4/2009 | Klatt | |

OTHER PUBLICATIONS http://www.yaskawa.com/site/products.nsf/products/Rotary%20Servomotors~SGMCSDirectDrive.html.

http://www.alxion.com/?gclid=CJPX3ZvpiLYCFQQYzQodXkcAtw.

http://www.yaskawa.eu.com/en/drives-motion-products/servo-drives/rotary-direct-drives/rotary-direct-drives.html.

* cited by examiner

TRANSVERSE FLUX ELECTRICAL MOTOR

The present application is based on and claims priority of U.S. Provisional Patent Application No. 61/238,224, filed Aug. 31, 2009.

BACKGROUND OF THE INVENTION

1. Technical Field

Embodiments of the present invention relate generally to electrical motors and, more particularly, but not exclusively, to transverse flux machines in which the electromagnetic force vector is perpendicular to the magnetic flux lines.

2. Description of Related Art

Linear motion systems are in common use in industry, with different systems available to handle a variety of applications.

One type of system uses a ball and screw arrangement, in which the ball screw is rotated by a static rotary motor. An advantage of this arrangement is that the electric cables that drive the system are statics, and therefore may be fixed to the main body of the machine. Some of the disadvantages however include limits in speed, and relatively high vibration, friction, and acoustic noise.

Where faster speed and smooth, high precision movements are required, electric motors having a stationary element and movable element are frequently employed. In some linear motors, for example, the movable element includes a current-carrying winding wrapped around a magnetic core of magnetizable material such as iron or steel, and the stationary element contains permanent magnets.

These linear motors have a disadvantage however in that the movable winding needs to be connected by cable to the driver current of the motor. In order to avoid deterioration of the connecting cables, a cable arrangement that is costly and complicated is usually required. Further, the cable connection creates mechanical friction and perturbations that affect the smoothness of the motor movement.

An alternative type of linear electric motor reverses placement of the components, by placing the windings and magnetic core on the stator and the permanent magnets on the moving element. An example of this motor configuration is shown in U.S. patent application US2007/0114854 to Miyamoto. A problem with this configuration however is that the windings and magnetic core are extended along the full length of the linear motor, which makes the motor relatively heavy and expensive. Further, these motors have low efficiency since only the small section of the winding that is in front of the moving element is active.

Both of these common types of linear motor also have a strong attraction force between the moving and the static elements. The attraction force acts as a constraint on movement, requiring additional current input to overcome, which further reduces motor efficiency.

Rotary motors work on the same principle as the above linear motors, but produce as mechanical output a shaft that rotates rather than one that moves back and forth along a straight-line path. Some rotary motors of the AC synchronous and DC brushless type accordingly have permanent magnets on the rotor, and winding and magnetic material on the stator. However, when these motors operate at high speed, the rotating magnets on the rotor become subject to a strong centrifugal force. This creates a risk that the magnets might dislodge and fly off. In order to reduce this risk, costly design features are needed.

One approach to this problem involves inserting the permanent magnets in dedicated slots inside the rotor magnetic material. This type of motor is called an Internal Permanent Magnet ("IPM") motor, and an example is shown in U.S. patent application 2007/0278886 to Fujiwara. A problem with IPM motors is that they include a "reluctance torque" which must be compensated by the electronic drive in order to maintain a constant torque for a given current amplitude at variable rotation angles. This design accordingly limits the maximum torque available to a lower value, and degrades the linear relationship between motor current and torque output.

Another type of rotary motor, called "Direct Drive", is designed to have a relatively large number of poles in order to obtain high torque. These motors are commonly used to directly activate loads at a relatively low speed, without the need for reduction gear. In such motors however the winding is arranged around the poles, so that the space needed for the winding limits the number of poles for a given diameter of the motor. Accordingly, in order to obtain the desired high torque, the direct drive motor becomes relatively large and heavy.

In recent years a different type of electric motor called transverse flux machines ("TFM's") have gained in popularity. Whereas in standard electric motors, such as those described above, the electromagnetic force vector is parallel to the magnetic flux lines, in TFM's the electromagnetic force vector is perpendicular to the magnetic flux lines. The TFM design allows the pole number to be increased without reducing the magnetomotive force per pole, and is therefore capable of producing power densities higher than a conventional machine. Some common disadvantages of TFM's include low power factor and complex construction with three-dimensional magnetic fields. The use of lamination in TFM's is complicated, so that sometimes the costly soft magnetic composite materials are required.

BRIEF SUMMARY OF THE INVENTION

According to an aspect of the present invention, there is provided a transverse flux electrical motor to produce motion from an input electric current, the electrical motor comprising:

a static element having a plurality of magnets arranged in at least two rows and defining a path of movement;

a magnetizable movable element having at least two openings, each opening being sized and shaped to receive a magnet from one of the rows of magnets, the movable element being movable along the path of movement such that the magnets of each row pass through one of said openings; and a plurality of windings positioned adjacent to the movable element, to receive the electric current and produce a magnetic flux circuit in the movable element and a force on the movable element in the direction of the path of movement;

wherein the magnetic flux circuit in the movable element is transverse to the direction of force on the movable element.

According to another aspect of the present invention, there is provided a transverse flux electrical motor wherein each magnet has a north pole and a south pole, and wherein, when a magnet is positioned inside the opening, each pole of the magnet has an interface with the opening.

According to yet another aspect of the present invention, there is provided a transverse flux electrical motor wherein the magnet rows and path of movement are linear, and wherein the electrical motor is a linear motor.

According to yet another aspect of the present invention, there is provided a linear electric motor wherein the magnets are positioned inside each opening such that opposing and substantially equal attraction forces form inside each opening, wherein the attraction force between the static element and the movable element of the motor is minimized.

According to yet another aspect of the present invention, there is provided a linear electric motor wherein the movable element comprises a plurality of carriage sections, and wherein there is at least one carriage section for each row of magnets.

According to yet another aspect of the present invention, there is provided a linear electric motor wherein the carriage sections in each row are spaced apart by the distance between two magnets of the same polarity in the same row.

According to yet another aspect of the present invention, there is provided a linear electric motor wherein each winding is a loop of several wires elongated along the length of two rows of magnets.

According to yet another aspect of the present invention, there is provided an electrical motor wherein the magnet rows and path of movement are circular, and wherein the electric motor is a rotary motor.

According to yet another aspect of the present invention, there is provided a rotary electrical motor wherein the movable element comprises a plurality of slots for each row of magnets, and the number of slots for each row of magnets is equal to half the number of magnets in the row.

According to yet another aspect of the present invention, there is provided a rotary electrical motor wherein each of the magnets has a north pole and a south pole, and wherein each magnet pole has an interface with the opening.

According to yet another aspect of the present invention, there is provided a rotary electrical motor wherein each magnet is divided into two parts, one of the parts having a north pole interface with the opening and the other of the parts having a south pole interface with the opening.

These, additional, and/or other aspects and/or advantages of the present invention are set forth in the detailed description which follows, and/or are possibly inferable from the detailed description, and/or learnable by practice of the present invention.

BRIEF DESCRIPTION OF THE DRAWINGS

The present invention will be further understood and appreciated from the following detailed description taken in conjunction with the drawings in which.

DETAILED DESCRIPTION OF THE PREFERRED EMBODIMENTS

Figure 1:
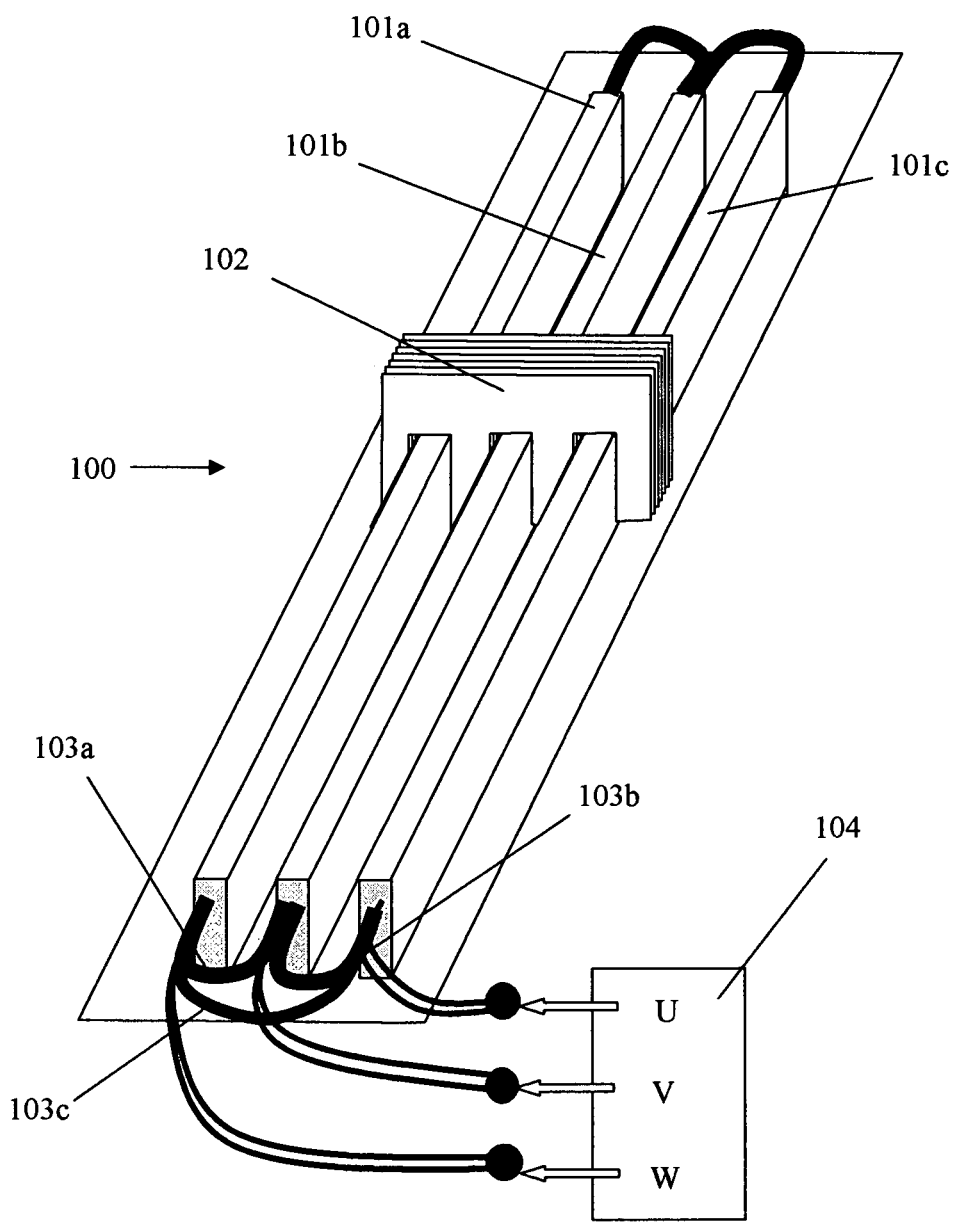
FIG. 1 is a perspective view of a three phase linear motor with three tracks, consistent with an embodiment of the present invention.

Reference will now be made in detail to embodiment(s) of the present invention, examples of which are illustrated in the accompanying drawings, wherein like reference numerals refer to the like elements throughout. Individual drawings may have like elements or sections corresponding to other drawings. These components are in some instances re-introduced and re-numbered in association with the particular drawing in which they appear. The embodiment(s) is/are described below to explain the present invention by referring to the figures.

Referring now to FIG. 1, there is shown a perspective view of a three phase linear motor 100 consistent with an embodiment of the present invention. Three linear tracks, 101a, 101b, and 101c, are disposed parallel to one another, and a carriage 102 made of magnetic laminar material is moveable along these three tracks. For drawing clarity the necessary mechanical arrangement is not shown, as it may be made using any type of linear bearing. Three windings 103a, 103b, and 103c, are run inside the tracks and connected to a three phase AC power drive 104.

Figure 2:
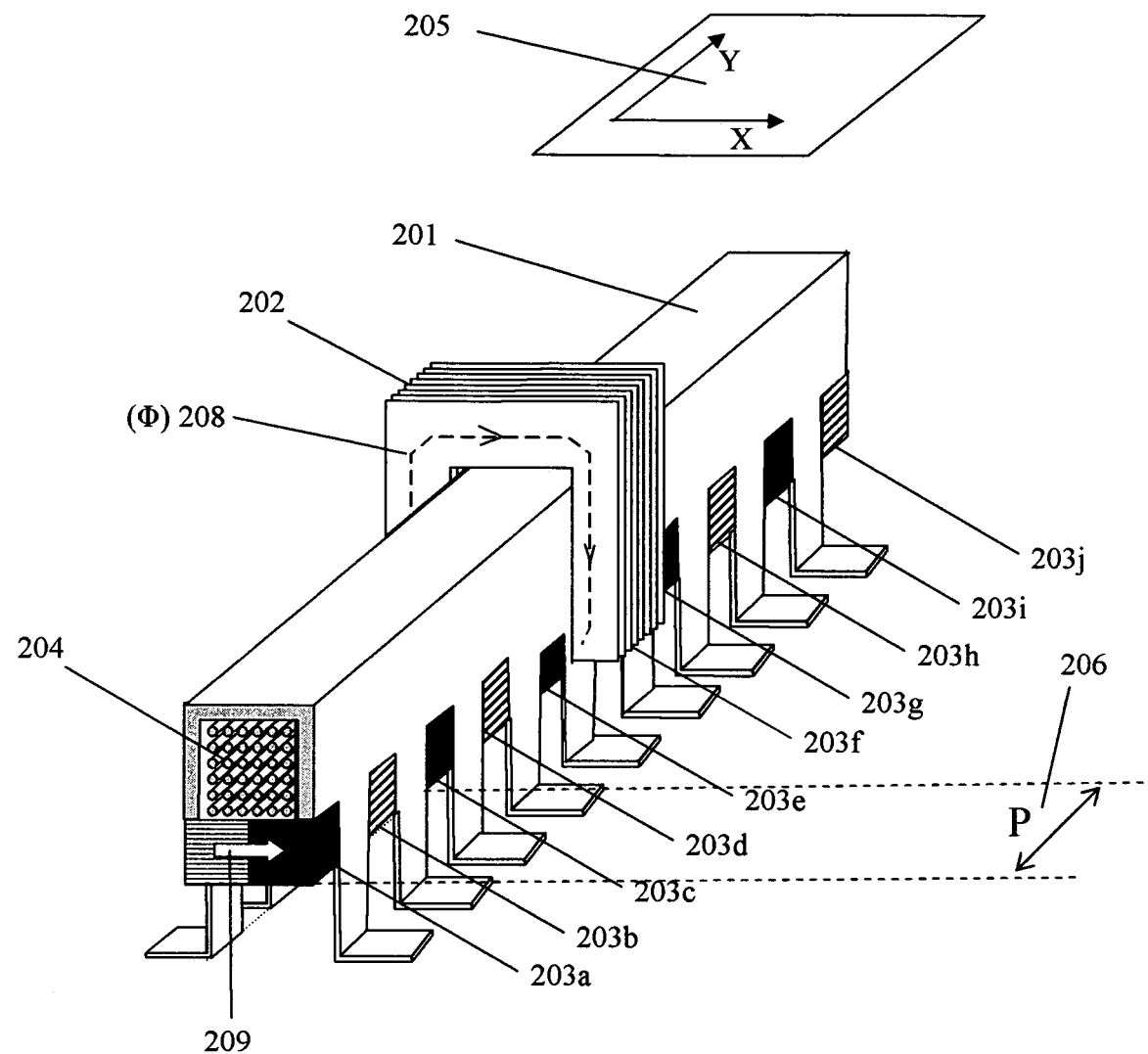
FIG. 2 is a perspective view of one track of the motor of FIG. 1, showing further detail of the track.

FIG. 2 shows a perspective view of a single track in greater detail. Reference coordinate axes X and Y 205 are shown for clarity, where Y indicates the path of movement of carriage 202 along track body 201, and where X indicates a direction perpendicular to Y. Track body 201 is used to hold winding wires 204, and can be made of any non magnetic material, such as aluminum or various type of plastic. Winding 204 is straight or elongated in shape and extends throughout the length of track body 201.

A plurality of permanent magnets 203 are arranged in a row and attached to track body 201. For illustration purposes, magnets 203 are shown relatively large in this figure. As indicated, each magnet 203 is positioned to create a magnetic field in the X direction, perpendicular to the direction of movement Y. The magnets are further positioned so that adjacent magnets alternate in orientation. Accordingly, as indicated by arrow 209, magnets 203a, 203c, 203e, 203g, and 203i create a magnetic field along the X axis in the positive direction, while magnets 203b, 203d, 203f, 203h, and 203j create a magnetic field in the opposite, negative X direction. Magnets 203 together with winding wires 204 form the stationary element or stator of the linear motor of this embodiment.

Moving carriage section 202 is moveable along track 201, and contains or is substantially or entirely formed from laminated magnetic material. With reference to FIG. 1, moving carriage section 202 of FIG. 2 comprises one third of the moving carriage 102. For clarity, a "carriage section" is a portion of a full carriage of a motor.

When moving carriage section 202 is at the same position on the Y axis as a magnet with a magnetic field in the positive X direction, then the magnetic material of carriage section 202 creates a magnetic circuit that captures the magnetic field, and a magnetic flux 208 (also called "phi" and having the symbol "Φ") is obtained running around winding wires 204 in a counter clock-wise direction. Equivalently, when moving carriage section 202 is at the same position on the X axis as magnet with a magnetic field in the negative X direction, magnetic flux 208 is obtained running around winding wires 204 in a clock-wise direction. In FIG. 2, moving carriage section 202 is shown at the position of magnet 203f on the Y axis. This magnet creates a magnetic field in the negative X direction, and accordingly magnetic flux 208 is shown (as a dashed line) rotating through carriage section 202 and around track body 201 and winding wires 204 in a clockwise direction.

Since magnetic flux (Φ) 208 has an alternating direction (clockwise and counter clock wise) during carriage movement along the Y direction, then the flux derivative (dΦ/dy) also has an alternating value. As indicated, a track period P 206 is defined as the distance in the Y direction between two magnets of the same orientation, as for example magnets 203a and 203c. For simplification, magnetic flux (Φ) 208 may be represented as sinusoidal, i.e. $\Phi=\Phi_0*\sin(2*\pi*y/P)$, where 'y' is the carriage section position on the Y axis, and '$\Phi_0$' is the amplitude of the flux. In practice magnetic flux (Φ) 208 is not exactly sinusoidal, and will vary in shape according to various geometric dimensions such as magnet size, magnet spacing, and carriage section shape. If an electric current is run into winding wires 204, then by the law of magnetism a force will be created in the Y direction that is proportional to the total current in all wires and the magnetic flux derivative, i.e. $(d\Phi/dy)=2*\pi/P*\Phi_0*\cos(2*\pi*y/P)$. Therefore for a single track 201 and moving carriage section 202, a force F is applied to the carriage section in the Y direction, where $F=k*I*\cos(2*\pi*y/P)$, where k is a constant, and I is the sum of all the currents running in winding wires 204.

In the motor of FIG. 2, the force and path of movement are in the same direction as the winding. The motor is a transverse flux motor, since the flux 208 of the magnetic circuit is transverse to the force and path of movement.

FIG. 2 also shows that winding 204 extends over the length of track 201, parallel to the row of magnets 203, before it loops back along an adjacent track (as shown in FIG. 1). Each magnet 203 forms a pole of the magnetic circuit. Unlike conventional motors, the winding does not need to form a specific coil in order to define a pole in the circuit. As a result, the winding shape is independent from the number of poles, according to some embodiments of the motor of the present invention. Accordingly, the number of poles in a given design can be increased by using smaller magnets. Since more poles enable more force, the motor would produce more force for a given input. Further, the cost of manufacturing would be reduced because smaller magnets have a lower cost per volume than relatively larger magnets.

Figure 3A:
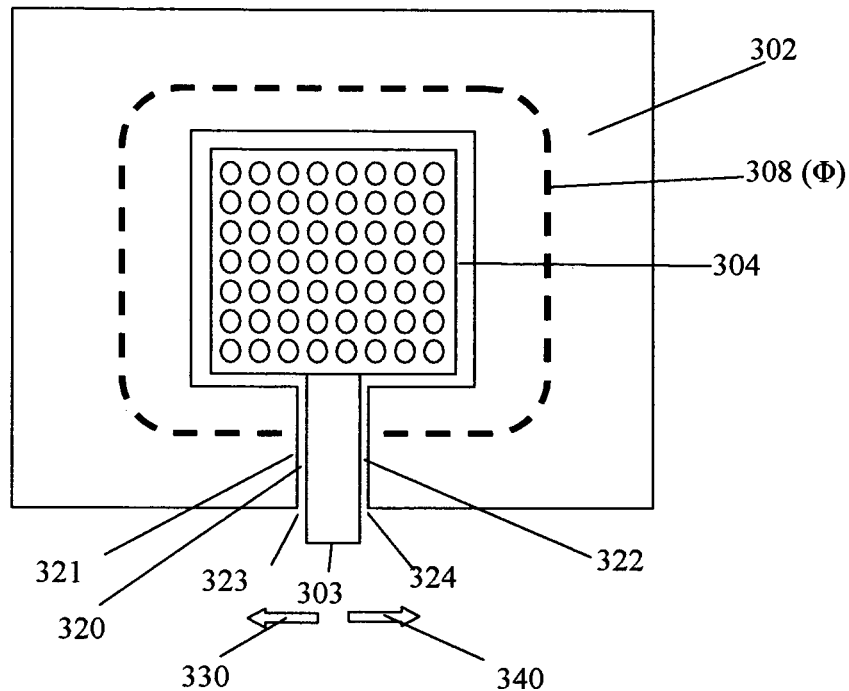
FIG. 3A is a diagram view of a magnetic flux circuit around one track of the motor of FIG. 1.

FIG. 3A shows the magnetic flux circuit for one track. The figure is a view of a cross section of the track, transverse to the linear path. As indicated, within the magnetic material of carriage section 302 there is formed a magnetic circuit or flux 308 (shown as a dashed line) around winding 304. Carriage section 302 has an opening 320 having parallel faces 321 and 322. According to some embodiments of the present invention, carriage section 302 has a single opening 320, and flux 308 of the magnetic circuit flows through this single opening.

A permanent magnet 303 is positioned within opening 320. Opening 320 and magnet 303 are sized and shaped so that magnet 303 fits inside opening 320 to leave at least a minimal opening or air gap on either side, so that there is no friction or contact between magnet 303 and carriage section 302. In this way, carriage section 302 can move freely along the path of movement, while remaining sufficiently close to magnet 303 to receive magnetic flux from the magnet and form an effective magnetic circuit. The smaller openings on either side of magnet 303 may be designated as openings or air gaps 323 and 324.

As noted, magnets 303 are arranged in a row along the track. Accordingly, when carriage section 302 moves along the linear path, the permanent magnets 303 pass successively in a row through magnetic circuit opening 320. Since permanent magnets 303 have alternating magnetic field direction, the magnetic flux 308 induced in carriage section 302 runs in alternating clockwise and anti-clockwise directions.

Figure 3B:
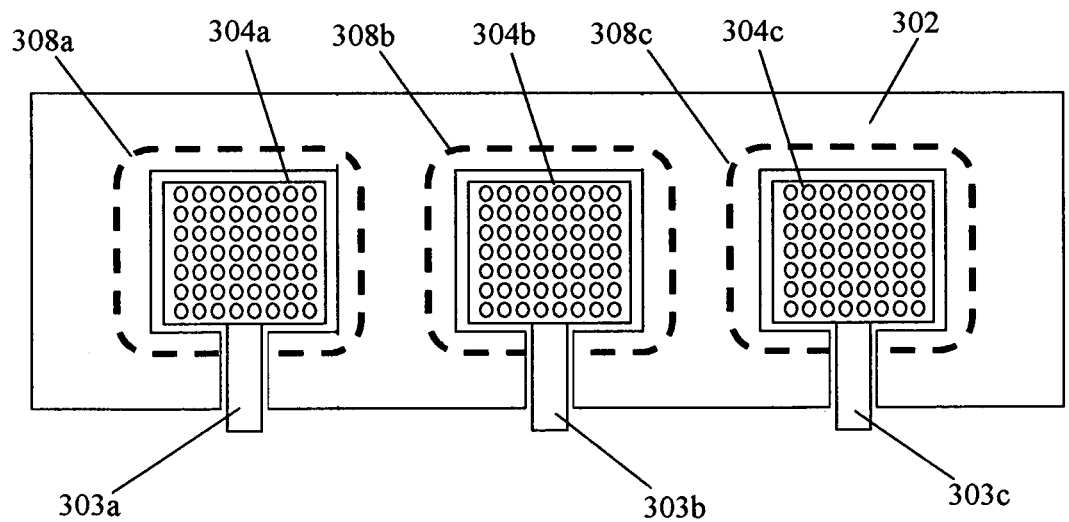
FIG. 3B is a diagram view of magnetic flux circuits around three tracks of the motor of FIG. 1.

FIG. 3B shows an example of a motor having three tracks, where the three carriage sections of three tracks are combined to form one carriage of magnetic material. The three tracks have permanent magnets 303a, 303b, and 303c, and corresponding windings 304a, 304b, and 304c, respectively. In this figure it may be seen how the carriage sections of three tracks are combined and form one carriage of magnetic material 302 that forms three magnetic flux circuits 308a, 308b, and 308c, around windings 304a, 304b, and 304c, respectively.

In the figures it can be seen that magnetic flux 308 in each magnetic circuit flows through its own separate and single opening 320. For example, FIG. 3B there are three rows of magnets, with each having a magnetic circuit flowing through its own single opening.

The drawings of FIG. 3 illustrate that the permanent magnet is positioned in opening 320 such each of the sides or poles (north and south) of the permanent magnet interface one of air gaps 323 or 324. For example, in FIG. 3A, the right side of magnet 303 represents one pole which interfaces air gap 324, across from face 322 of carriage section 302. Similarly, the left side of magnet 303 represents the other pole interfacing air gap 323, across from face 321 of carriage section 302. Magnetic flux 308 accordingly passes out face 322, through air gap 324, into magnet 303 at one pole, out magnet 303 from the other pole, into air gap 323, and into carriage section 302 at face 321. Alternatively, magnetic flux 308 travels through the same elements in the reverse direction, depending on the position of carriage section 302.

In this way, the attraction force that occurs between the permanent magnet of the stator and the moving carriage is balanced between the two sides of the permanent magnet. This is shown in FIG. 3A, where arrow 330 represents the attraction force between magnet 303 and the left side of carriage section 302, and arrow 340 represents the attraction force between magnet 303 and the right side of carriage section 302. The attraction forces 330 and 340 are substantially equal in strength, and are aligned along the same path but in opposite directions. Accordingly, the two forces substantially cancel one another, and the total attraction force is substantially reduced or eliminated.

Figure 4:
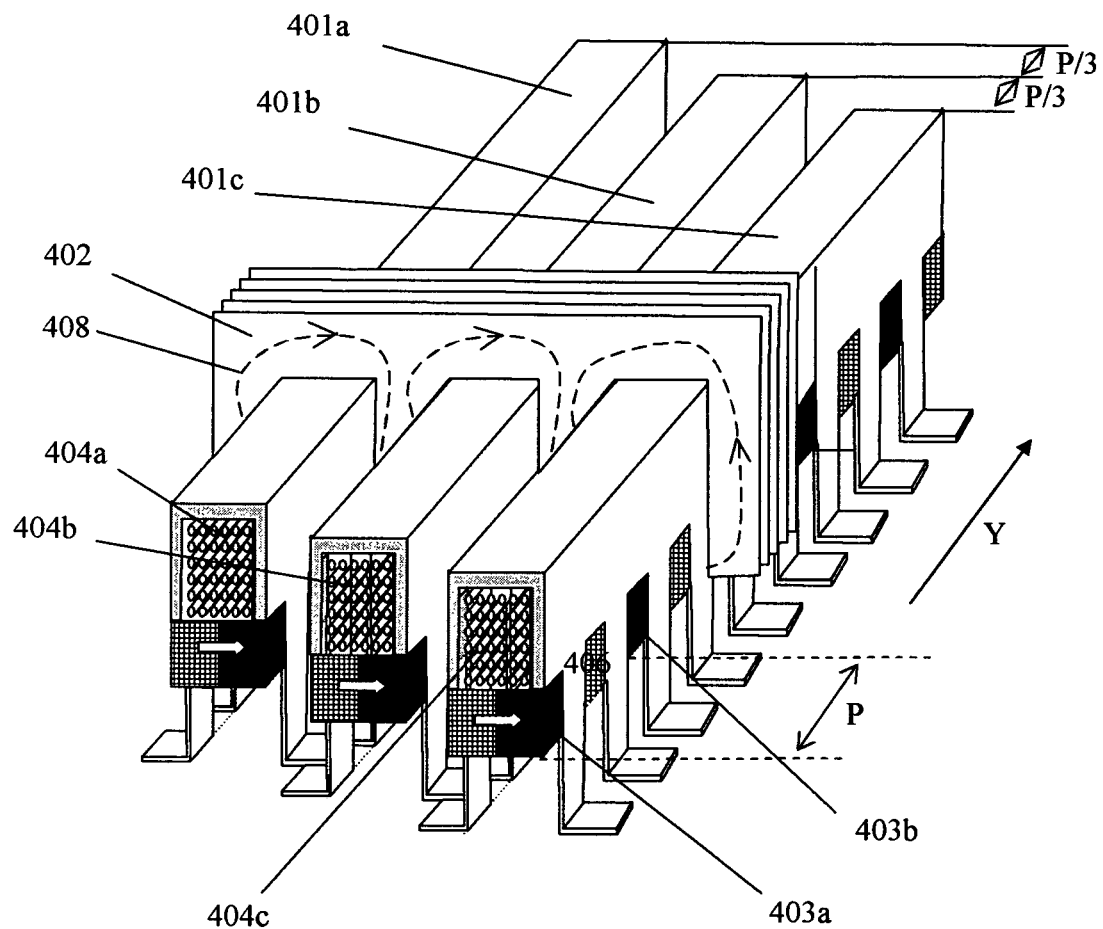
FIG. 4 is a perspective view of a three phase linear motor with three tracks, where the tracks are phase-shifted relative to one another, consistent with an embodiment of the present invention.

Referring to FIG. 4, three tracks 401a, 401b, and 401c, similar to those described in FIG. 2 above, are used to make a three phase motor. Flux 408 in each track is shown. The three tracks are fixed parallel to the Y direction. As above, the track period P is defined as the distance in the Y direction between two magnets of the same orientation, as for example magnets 403a and 403b. Track 401b is shifted by a length P/3 in the Y direction relative to track 401a, and track 401c is shifted by a length P/3 in the Y direction relative to track 401b. The total current running in all the winding wires 404a, 404b, and 404c, of each track, may be designated as I1, I2, and I3, respectively.

Accordingly, the force F applied to moving carriage 402 is:

$$F=k*I1*\cos(2*\pi*y/P)+k*I2*\cos(2*\pi*y/P+2*\pi/3)+k*I3*\cos(2*\pi*y/P+4*\pi/3)$$

The generated input AC current is:

$$I1=I*\cos(2*\pi*y/P)$$

$$I2=I*\cos(2*\pi*y/P+2*\pi/3)$$

$$I3=I*\cos(2*\pi*y/P+4*\pi/3)$$

where I is the three phase current amplitude.

The resulting force is F=1.5*k*I, which is directly proportional to the input current amplitude. The result is then a linear motor having static windings and magnets.

As noted, the force produced by a magnetic circuit is generally sinusoidal. As a result, at some points in time during operation of the motor there will be zero force produced by the circuit. Accordingly, in order for the motor to provide a desirable continuous force, at least two tracks of magnet rows are used to form the motor according to some embodiments of the invention. The multiple tracks should include at least two that are phase shifted relative to one another, so that at any point in time at least one magnetic circuit is producing some degree of force.

Figure 5:
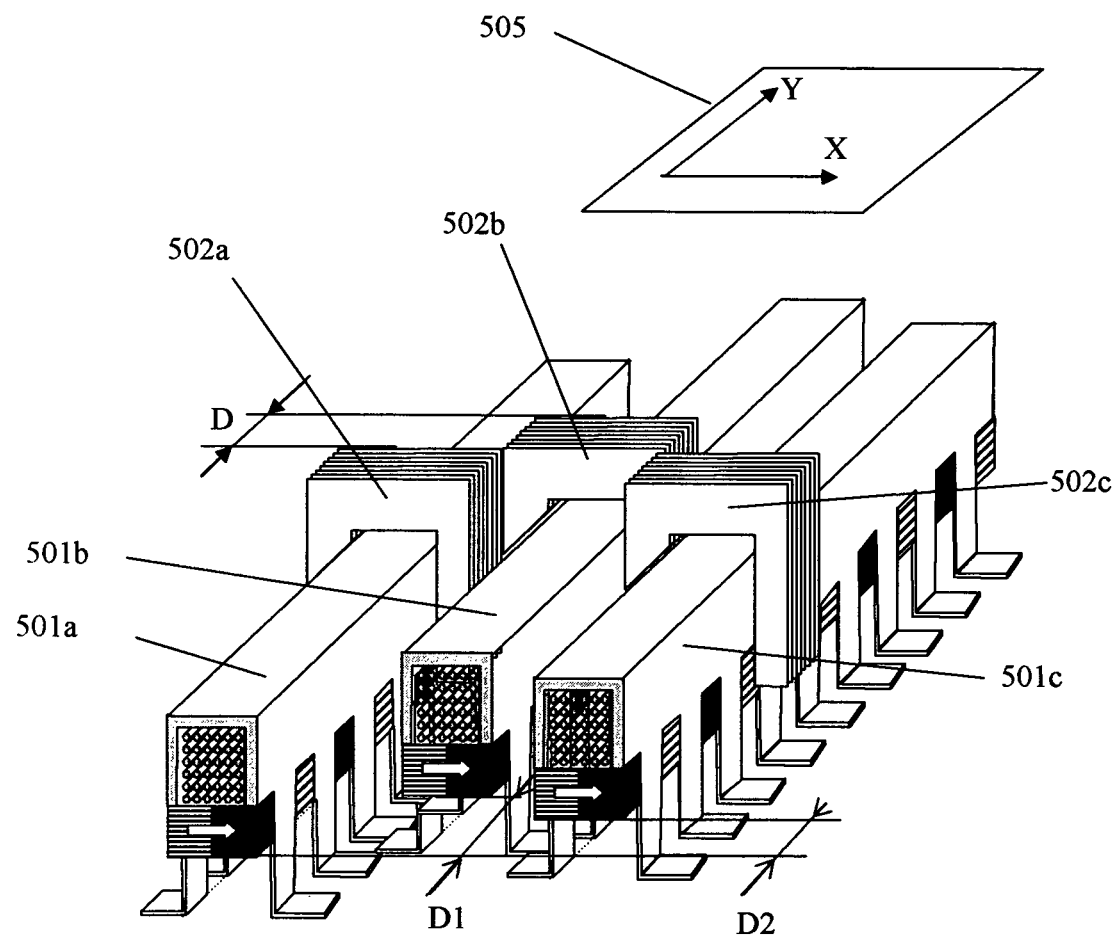
FIG. 5 is a perspective view of a three phase linear motor with three tracks, where the carriage is made of three mechanically coupled independent carriage sections, consistent with an embodiment of the present invention.

FIG. 5 shows an embodiment of the present invention having three tracks, 501a, 501b, and 501c, and in which the moving carriage is made up of three separate carriage sections 502a, 502b, and 502c, that are mechanically coupled to one another. For drawing clarity, the mechanical link between the carriage sections is not shown. The Y and X directions are indicated by reference coordinate axes 505. In operation, each carriage section contains a magnetic circuit.

In this arrangement, the magnetic circuits in carriage sections 502a and 502c are aligned in the Y direction, and carriage section 502b is shifted by a distance D from the other two along the Y direction. In order to obtain the same equivalent phase difference as for the case shown in FIG. 4, track 501b is shifted by a distance D1=D+P/3, and track 501c is shifted by a distance D2=2*P/3. This arrangement separates the three magnetic circuit fluxes, so that a lower magnetic induction is obtained in the magnetic material positioned between the tracks, and thus saturation level of the magnetic field is avoided. In this way, this arrangement provides a higher available force on the carriage.

Figure 6:
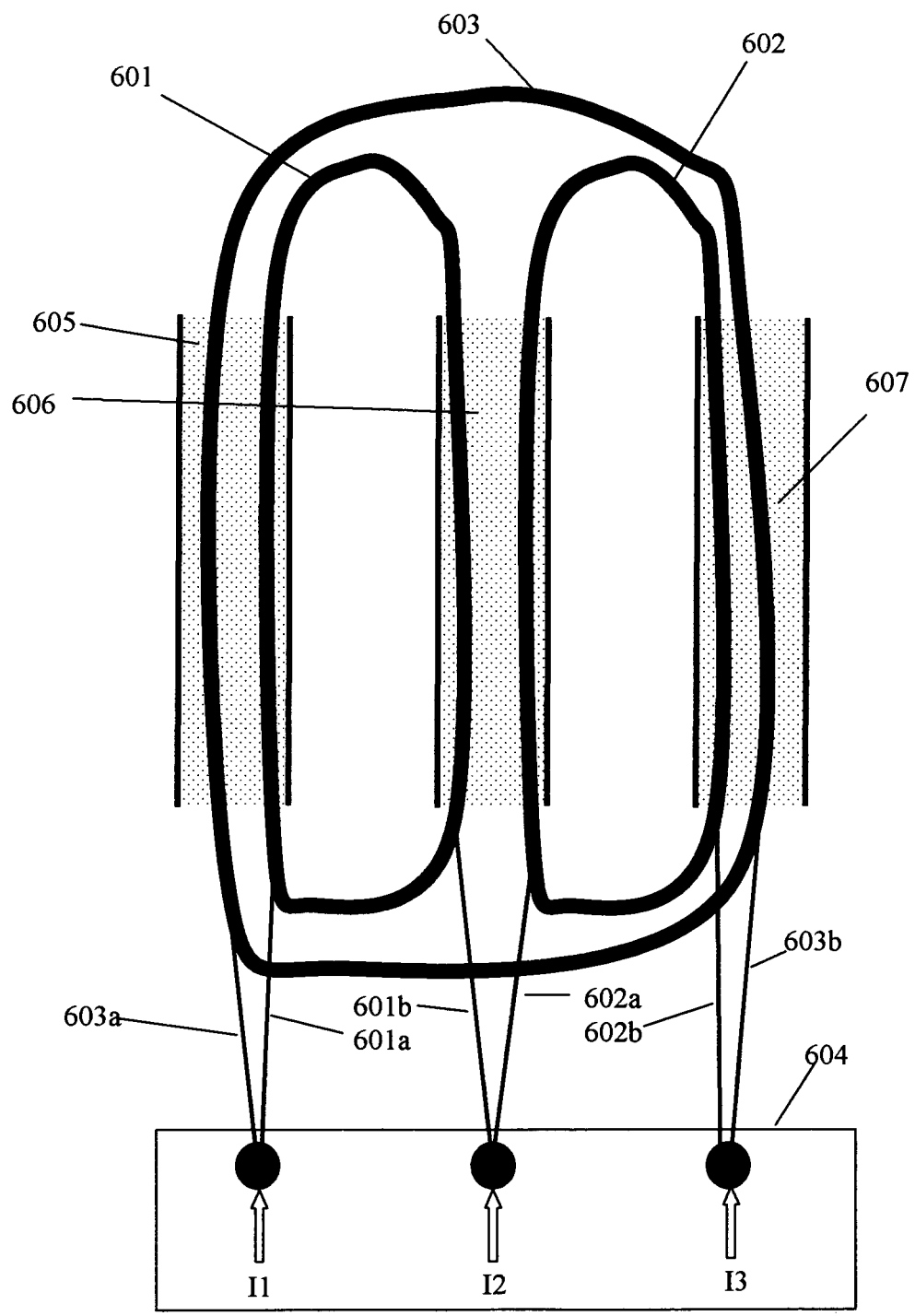
FIG. 6 is a diagram view showing a delta wiring connection for the three phase linear motor embodiments of the previous figures.

FIG. 6 illustrates the wiring of the linear motor described above by the commonly used "Delta" connection. As indicated, the motor includes three windings 601, 602 and 603. Each winding consists of several loops of a conducting wire having end sections 601a and 601b for winding 601, end sections 602a and 602b for winding 602, and end sections 603a and 603b for winding 603. The loops of winding 601 are elongated along the direction of tracks 605, 606, and 607, and are arranged to travel along or through tracks 605 and 606. The same arrangement is also set for winding 602 with tracks 606 and 607, and for winding 603 with tracks 605 and 607. The end sections of the windings, i.e. 601a, 601b, 602a, 602b, 603a, and 603b, are then connected to an AC power drive 604 that drives currents I1, I2 and I3 into the winding. The connection to the AC power generator is such that each winding is connected between two terminals of the said generator. As noted, this type of motor connection is known as a delta connection.

Figure 7:
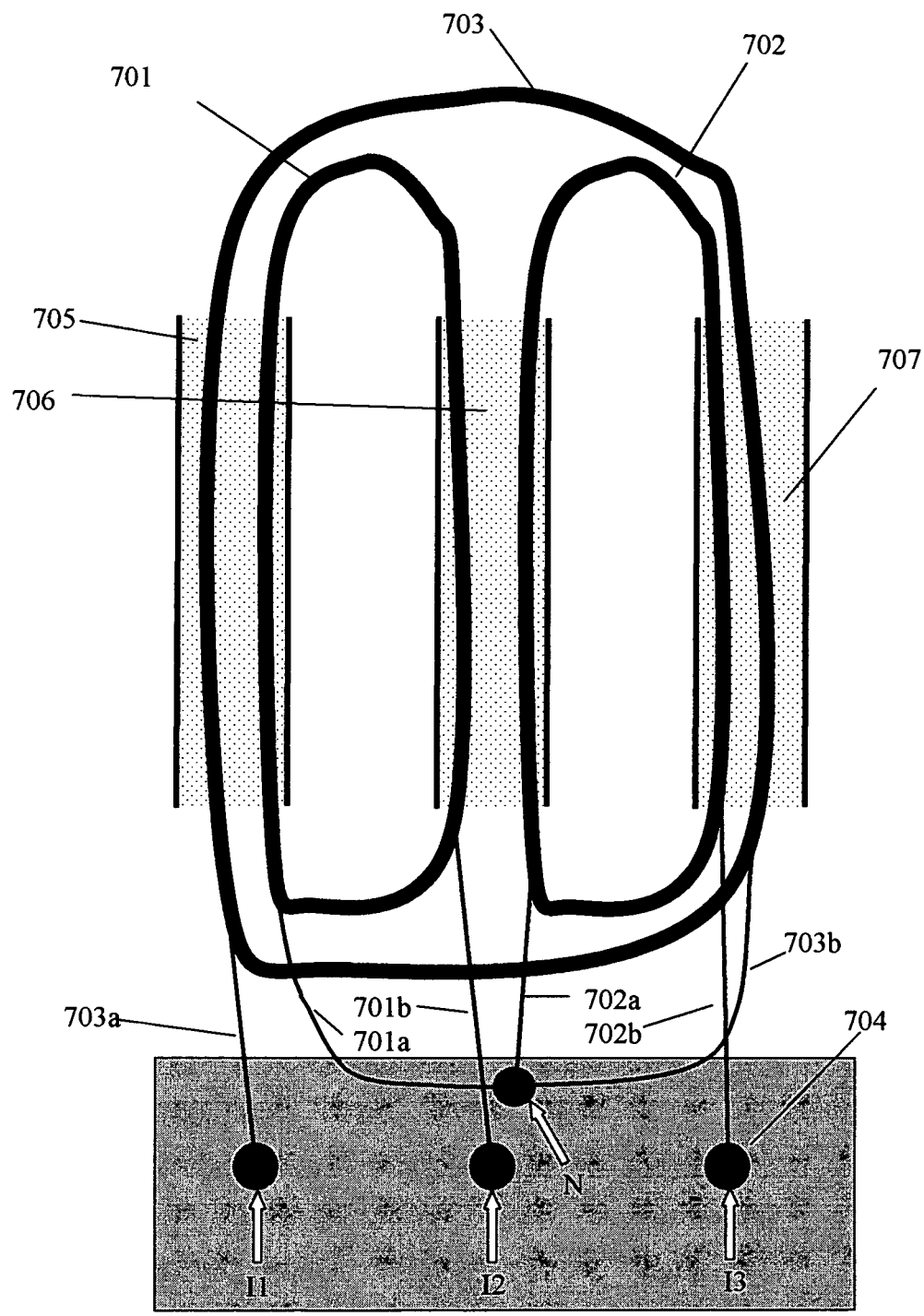
FIG. 7 is a diagram view showing a star wiring connection for the three phase linear motor embodiments of the previous figures.

In FIG. 7 a "Star" type wiring connection is shown, where all windings have a common terminal N. As indicated, the motor includes three windings 701, 702, and 703, corresponding end sections 701a and 701b, 702a and 702b, and 703a and 703b, and three tracks 705, 706, and 707, connected to an AC power drive 704. The star and delta connections are well known methods of connecting electrical motors. The star connection is generally fit for higher voltage and lower current than the delta connection.

Figure 8:
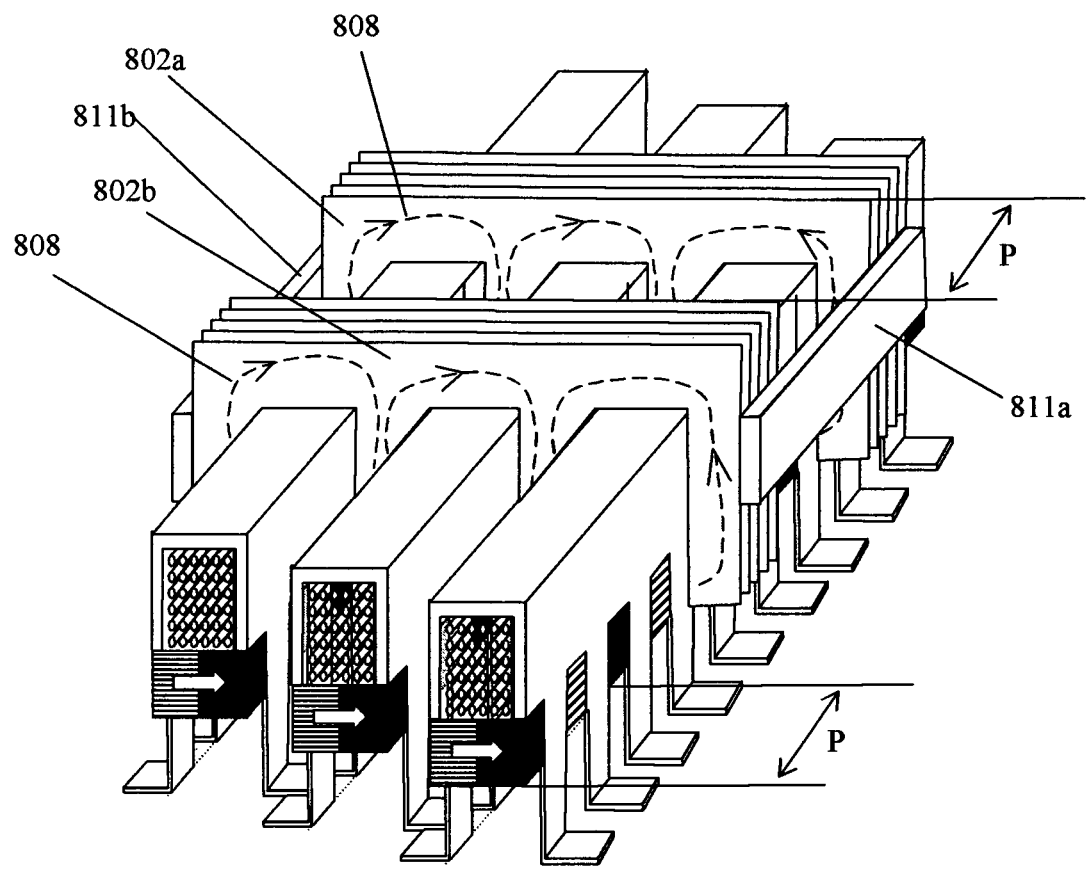
FIG. 8 is a perspective view of a three phase linear motor with three tracks, having two mechanically coupled carriage sections, consistent with an embodiment of the present invention.

Referring to FIG. 8, an embodiment of the present invention is shown having two carriage sections 802a and 802b, mechanically coupled by coupling elements 811a and 811b. In some embodiments, each carriage section 802a and 802b may optionally be separated into three parts, as shown in the embodiment of FIG. 5. Flux lines 808 from magnetic circuits in carriage sections 802 are also shown. The distance between the two carriage sections is set to be equal to the period P, so that each carriage section is subject to the same force, and the total force applied on the assembly of the two carriage sections is double. It is an advantage of the present invention that the useful force is double while the winding current is the same as for the case with one carriage. In the same way, an arbitrary number N of carriage elements can be coupled to obtain a force multiplied by N. Accordingly, the period P can be made small by the use of small magnets, and a large number of mechanically coupled carriage elements can be used within the desired length of the carriage assembly in order to get a high force linear motor.

In addition to its use as a linear motor that generates mechanical movement along a straight-line or linear path, the motor of the present invention may also be implemented as a rotary motor. The same principles described above for a linear motor can be applied to a rotary configuration. In that case the linear path is changed to a circular path, and the moving element is shaped into a rotor including magnetic material only, without winding or permanent magnets.

In the case of the rotary motor, the number of carriage sections N, i.e. elements having magnetizable material through which a magnetic circuit is formed, can be made equal to the number of periods in the circumference of the path of movement. In that case, a high torque rotary motor can be achieved for usage in direct drive applications.

Figure 9:
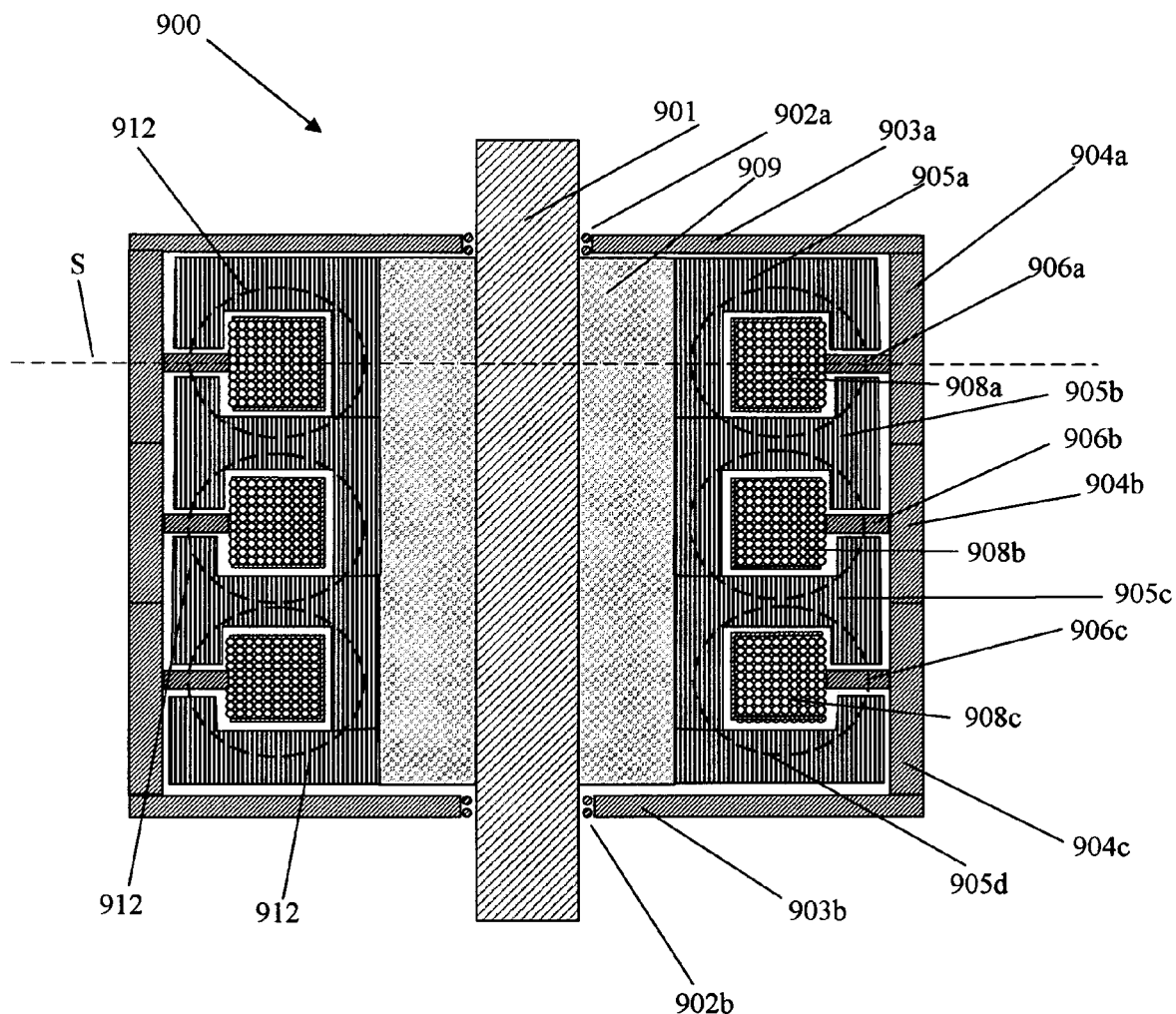
FIG. 9 is an axial cross-section of a three phase rotary motor, consistent with an embodiment of the present invention.

Referring to FIG. 9, a cross section view of rotary motor embodiment 900 is shown. In this view, the cross section plane is parallel to a shaft 901 and includes the rotation axis of the motor.

The stator of rotary motor 900 includes windings 908a, 908b, and 908c, permanent magnets 906a, 906b, and 906c, and the following structural elements: two discs 903a and 903b, and three cylinders 904a, 904b, and 904c. The windings 908a, 908b, and 908c have an annular shape. Since in this embodiment the movement path is a closed circular path, then each winding can be wound in an annular shape and associated with one circular track only. The permanent magnets 906a, 906b, and 906c extend along a small angular section of the stator perimeter, so that there is a plurality of such magnets in the whole circumference of the motor (as is shown below in FIG. 10). Adjacent magnets along a circular track alternate in polarity, as shown previously for magnets along a straight track of a linear motor.

The rotor includes laminated magnetic material 905a, 905b, 905c, and 905d, assembled to form magnetic circuits around the windings. The magnetic material 905a-905d is inserted in radial slots cut into a structural piece 909, mounted on the motor shaft 901. These slots are not apparent in the view of this figure, and will be shown below in FIG. 10 for a cross section plane at the position shown as S in this figure. Bearings allowing the rotor rotation are symbolically shown at 902a and 902b.

In this figure magnetic flux lines 912 that define the magnetic circuit of the rotary motor are shown. It can be seen that flux lines 912 are transverse to windings 908, and pass through magnetic material 905 of the rotor, the single opening within magnetic material 905, and magnets 906 of the stator. Magnets 906 are positioned within the opening such that both sides or poles interface the air gaps formed within the opening.

Figure 10:
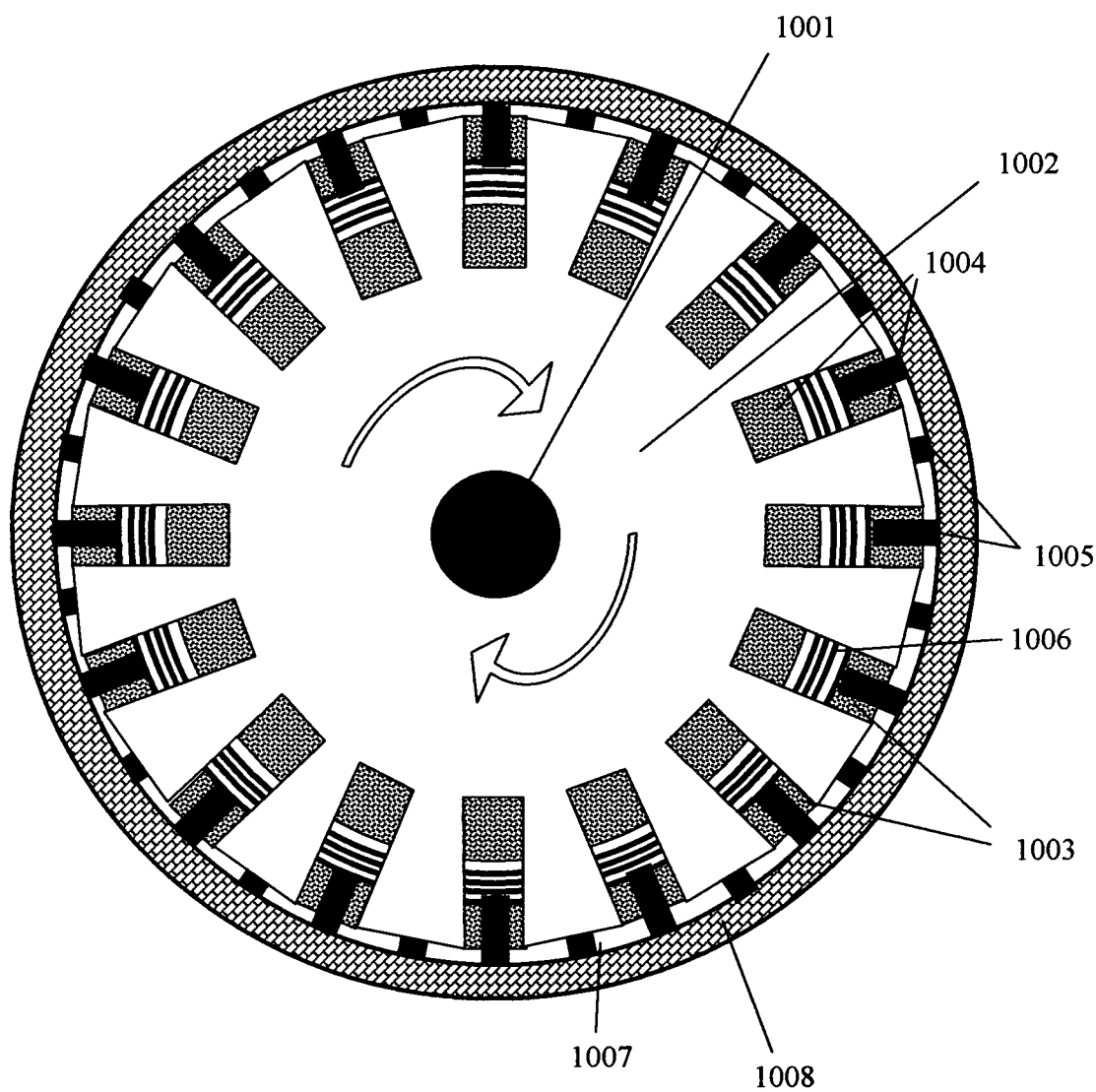
FIG. 10 is a radial cross-section of the rotary motor of FIG. 9, consistent with an embodiment of the present invention.

In FIG. 10 is shown a cross section for a plane perpendicular to shaft 1001 at the position shown as S in FIG. 9. A structural piece 1002 (element 909 of FIG. 9) of the rotor is shown having sixteen rectangular slots 1003 on its outer diameter, and it is in these slots that magnetic laminar material 1004 is inserted. Slots 1003 with magnetic material 1004 are analogous to the carriage sections discussed above with respect to linear motors of the present invention. Two unmarked arrows on structural piece 1002 indicate rotation of shaft 1001 and structural piece 1002. FIG. 10 is shown for a specific rotation angle where permanents magnets 1005 are also visible. In this view winding 1006 can also be seen. Cylinder 1008 holds the magnet rows and windings, and element 1007 is an air space between the rotary elements and cylinder 1008.

The view of FIG. 10 shows a circular track, circular row, or set of magnets 1005. In this example it can be seen that there are thirty-two magnets 1005 in the circular row. In other embodiments a larger or smaller number of magnets may be selected, as appropriate. Since adjacent magnets alternate in polarity, the sixteen magnets 1005 visible in slots 1003 are of the same polarity, while the other sixteen magnets that are obscured by structural piece 1002 (and accordingly only partially shown in the figure) are of the opposite polarity. Slots 1003 can be spaced apart by a distance equal to the pitch P, i.e. the distance between magnets of the same polarity. Accordingly, there can be half as many slots as magnets in a circular row, and in the example of FIG. 10 there are sixteen slots for thirty-two magnets.

In this embodiment, the rotary motor has three sets of permanent magnets 1005. Only one set can be seen in FIG. 10. The three sets may be seen more clearly in FIG. 9, which shows three sets having representative magnets 906a, 906b, and 906c, respectively. In FIG. 9, each such set of magnets includes thirty-two magnets having a magnetic field that is parallel to the shaft and transverse to the path of rotation.

The rotary motor described in FIGS. 9 and 10 accordingly represent a rotary implementation of the linear motor described above in FIGS. 1 to 8. Similar to the linear motor embodiment, the motor should have at least two circular tracks or magnet rows to provide continuous force.

Figure 11:
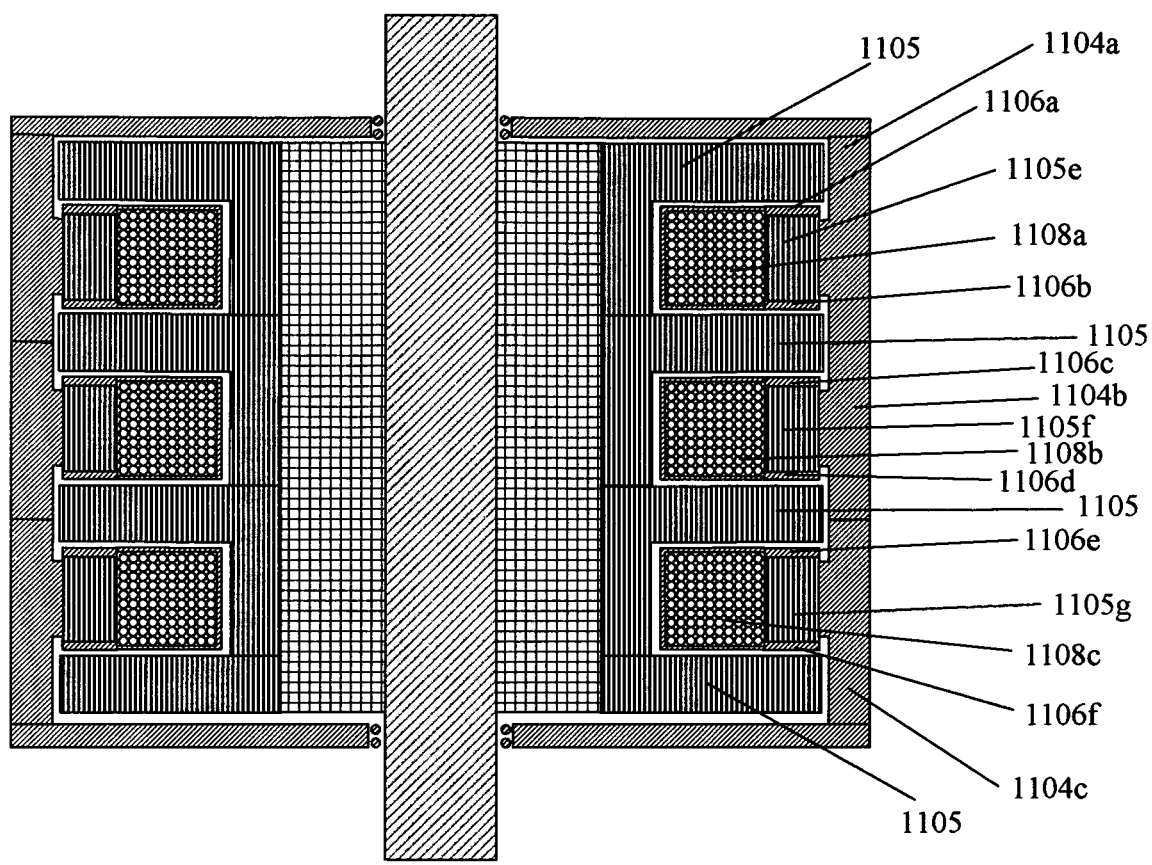
FIG. 11 is an axial cross-section of a three phase rotary motor, consistent with an embodiment of the present invention.

Referring now to FIG. 11, an embodiment of a rotary motor of the present invention is shown wherein the permanent magnets 906a, 906b, and 906c shown in FIG. 9 are each replaced by a pair of two permanent magnets 1106a and 1106b, 1106c and 1106d, and 1106e and 1106f for each circular track, respectively. Between each pair of magnets, magnetic material 1105e, 1105f, and 1105g is inserted. This magnetic material may optionally be laminated or not laminated, annular shaped, or divided into limited radial sections extending between the permanent magnets. This embodiment provides a stronger mechanical structure of the stator, allowing a wider and stronger support linkage of the annular winding 1108a, 1108b, and 1108c to the stator structural elements 1104a, 1104b, and 1104c.

As explained above in reference to FIG. 10, the permanent magnets extend over a small angular section of the motor perimeter, so that a motor includes three sets of thirty-two magnet assemblies disposed at regular angular distances on the circumference of the motor. Each magnet assembly consists of a pair of permanent magnets 1106 disposed on either side of an annular shaped magnetic material 1105e, 1105f, and 1105g.

In this embodiment, one of the magnets in each magnet assembly or pair has a north pole that interfaces the air gap in the rotor, and the other magnet in each magnet pair has a south pole that interfaces the air gap. In this way, the magnetic circuit passes through magnetizable material 1105 of the rotor, an air gap, one pole of the magnet, further magnetizable material of the stator (e.g. 1105e), the other magnet pole, the other air gap, and the magnetizable material of the rotor.

As the foregoing illustrates, embodiments of the present invention provide a linear electric motor that has, unlike most conventional linear motors, windings and permanent magnets on the stator or static element and magnetic material only on the carriage or moving element. This enables the motor of the present invention to be made without a costly and complicated cable connection to deliver power to the windings, and relieves the problem of movement perturbation that occurs with that type of arrangement. The carriage is also improved as it is lighter and therefore can be moved with more force for the same input power. In addition, the absence of winding coils in the carriage substantially reduces or eliminates heat elevation that otherwise occurs in the carriage due to windings. This can be beneficial in some applications where the object being moved is particularly sensitive to heat, such as semiconductor wafer applications, for example.

Another advantage of the motor of the present invention is that the winding shape is independent of the number of poles, since the winding does not need to form a coil for each pole. As a result, the stator is generally lighter than known motors that have windings in the stator, as the latter generally have windings around each pole of magnetic material. In addition, the motor of the present invention can accordingly be implemented with a larger number of smaller magnets. This increases the number of poles, which enables a larger force output. Further, the use of smaller magnets enables lower cost of production, because small magnets have a lower cost per volume than large magnets.

Yet another advantage is that the design of the present invention balances the attraction forces between the static element and the moving element, so that this restraint on performance is substantially reduced or eliminated. As a result, the motor can produce more force since there is very little if any attraction force that needs to be overcome by higher current.

In this way, some embodiments of the linear motor of the present invention provides advantages of simpler design and construction, lighter weight, lower cost of manufacture, and higher force with less heat and movement perturbation.

Embodiments of the present invention also provide a rotary electrical motor that has similar advantages as those provided by embodiments of the linear electric motor described above. The design is simpler and less costly since permanent magnets are on the stator rather than the rotor, and the issue of centrifugal force acting on the magnets is eliminated. A higher acceleration may be achieved because the rotor is lighter since the magnets are on the stator. In this way, the rotor can rotate at high speed while maintaining a linear relationship between current and torque. The use of small magnets enables lower cost and provides more magnetic poles, which enables a larger torque.

In this way, some embodiments of the rotary motor of the present invention provide advantages of simpler design, lower cost of manufacture, and higher torque for a given motor size than many standard direct drive motors.

Although selected embodiment(s) of the present invention has/have been shown and described, it is to be understood that the present invention is not limited to the described embodiment(s). Instead, it is to be appreciated that changes may be made to this/these embodiment(s) without departing from the principles and spirit of the invention, the scope of which is defined by the claims and the equivalents thereof.

The invention claimed is:

1. A transverse flux electrical motor to produce motion from an input electric current, said electrical motor comprising:
   a static element having a plurality of magnets arranged in at least two rows and defining a path of movement; and
   a magnetizable movable carriage element having at least two openings, each opening being sized and shaped to receive a magnet from one of the rows of magnets, such that said magnet is substantially enclosed within said opening, the movable element being movable along the path of movement such that the magnets of each row pass through one of said openings interstitially,
   wherein the magnets are positioned inside each opening such that said opening has a north pole facing one side of the opening and a south pole facing the other side of the opening,
   such that opposing and substantially equal attraction forces form inside each opening, wherein the attraction forces between the static element and the movable element of the motor is minimized; and
   a plurality of coiled windings positioned adjacent to the movable element, to receive the electric current and produce a magnetic flux circuit in the movable element and a force on the movable element in the direction of the path of movement,
   wherein said magnetizable movable carriage element is on a first portion of said motor, while said static element having said plurality of magnets and said coiled windings are on a separate second portion of said motor; and
   wherein the magnetic flux circuit in the movable element is transverse to the direction of force on the movable element.

2. The transverse flux electrical motor according to claim 1, wherein each winding is fixedly attached to the static element.

3. A transverse flux electrical motor to produce motion from an input electric current, said electrical motor comprising:
   a static element having a plurality of magnets arranged in at least two rows and defining a path of movement; and
   a magnetizable movable carriage element having at least two openings, each opening being sized and shaped to receive a magnet from one of the rows of magnets, such that said magnet is substantially enclosed within said opening, the movable element being movable along the path of movement such that the magnets of each row pass through one of said openings interstitially,
   wherein the magnets are positioned inside each opening such that said opening has a north pole facing one side of the opening and a south pole facing the other side of the opening,
   such that opposing and substantially equal attraction forces form inside each opening, wherein the attraction forces between the static element and the movable element of the motor is minimized; and
   a plurality of coiled windings positioned adjacent to the movable element, to receive the electric current and produce a magnetic flux circuit in the movable element and a force on the movable element in the direction of the path of movement,
   wherein each winding is aligned with the path of movement, and wherein the magnetic circuit and the windings are entirely comprised in the moving element, completely separate from the magnets on the stator, and wherein the magnetic flux circuit in the movable element is transverse to the direction of force on the movable element.

4. The transverse flux electrical motor according to claim 1, wherein each of the magnets produces a magnetic field traverse to the path of movement.

5. The transverse flux electrical motor according to claim 1, wherein adjacent magnets in each row are oriented to produce magnetic fields in opposing directions.

6. The transverse flux electrical motor according to claim 1, wherein the movable element is substantially formed from magnetizable material.

7. The transverse flux electrical motor according to claim 1, wherein each magnet has a north pole and a south pole, and wherein, when a magnet is positioned inside the opening, each pole of the magnet has an interface with the opening.

8. The transverse flux electrical motor according to claim 1, wherein the magnet rows and path of movement are linear, and wherein the electrical motor is a linear motor.

9. The transverse flux electrical motor according to claim 8, wherein the magnets are positioned inside each opening such that opposing and substantially equal attraction forces form inside each opening, wherein the attraction force between the static element and the movable element of the motor is minimized.

10. The transverse flux electrical motor according to claim 8, wherein the movable element comprises a plurality of carriage sections, and wherein there is at least one carriage section for each row of magnets.

11. The transverse flux electrical motor according to claim 10, wherein the carriage sections in each row are spaced apart by the distance between two magnets of the same polarity in the same row.

12. The transverse flux electrical motor according to claim 10, wherein carriage sections on adjacent rows of magnets are shifted relative to one another.

13. The transverse flux electrical motor according to claim 10, wherein carriage sections on adjacent rows are combined in one piece.

14. The transverse flux electrical motor according to claim 8, wherein each winding is a loop of several wires elongated along the length of two rows of magnets.

15. The transverse flux electrical motor according to claim 1, wherein the magnet rows and path of movement are circular, and wherein the electrical motor is a rotary motor.

16. The transverse flux electrical motor according to claim 15, wherein the movable element comprises a plurality of slots for each row of magnets, and the number of slots for each row of magnets is equal to half the number of magnets in the row.

17. The transverse flux electrical motor according to claim 15, wherein each of the magnets has a north pole and a south pole, and wherein each magnet pole has an interface with the opening.

18. The transverse flux electrical motor according to claim 15, wherein each magnet is divided into two parts, one of the parts having a north pole interface with the opening and the other of the parts having a south pole interface with the opening.

19. The transverse flux electrical motor according to claim 18, wherein magnetic material is inserted between the two parts of each magnet.

20. A transverse flux electrical motor to produce motion from an input electric current, said electrical motor comprising:
- a static element having a plurality of magnets arranged in at least two rows and defining a path of movement; and
- a magnetizable movable carriage element having at least two openings, each opening being sized and shaped to receive a magnet from one of the rows of magnets, such that said magnet is substantially enclosed within said opening, the movable element being movable along the path of movement such that the magnets of each row pass through one of said openings interstitially,
- wherein the magnets are positioned inside each opening such that said opening has a north pole facing one side of the opening and a south pole facing the other side of the opening,
- such that opposing and substantially equal attraction forces form inside each opening, wherein the attraction forces between the static element and the movable element of the motor is minimized; and
- a plurality of coiled windings positioned adjacent to the movable element, to receive the electric current and produce a magnetic flux circuit in the movable element and a force on the movable element in the direction of the path of movement,
- wherein said magnetizable movable carriage element is on a first portion of said motor, while said static element having said plurality of magnets and said coiled windings are on a separate second portion of said motor; and
- wherein the magnetic flux circuit in the movable element is transverse to the direction of force on the movable element,
- and wherein the magnet rows and path of movement are linear, and wherein the electrical motor is a linear motor,
- and wherein the movable element comprises a plurality of carriage sections, and wherein there is at least one carriage section for each row of magnets.

21. The transverse flux electrical motor according to claim 20, wherein the magnet rows and path of movement are circular, and wherein the electrical motor is a rotary motor,
- and wherein the movable element comprises a plurality of slots for each row of magnets, and the number of slots for each row of magnets is equal to half the number of magnets in the row.

22. The transverse flux electrical motor according to claim 20, wherein each magnet is divided into two parts, one of the parts having a north pole interface with the opening and the other of the parts having a south pole interface with the opening,
- wherein magnetic material is inserted between the two parts of each magnet, and
- wherein magnetic material is inserted between the two parts of each magnet.

* * * * *